(12) United States Patent
Akchurin et al.

(10) Patent No.: US 12,129,715 B2
(45) Date of Patent: Oct. 29, 2024

(54) APPARATUS FOR PROTECTING AND ATTACHING CABLE TO PIPES (71) Applicant: Timur Rustamovich Akchurin, Moscow (RU)

(72) Inventors: Timur Rustamovich Akchurin, Moscow (RU); Aleksandr Vladimirovich Lobov, g. Neftekamsk (RU)

(*) Notice: Subject to any disclaimer, the term of this patent is extended or adjusted under 35 U.S.C. 154(b) by 478 days.

(21) Appl. No.: 17/441,773

(22) PCT Filed: Feb. 16, 2021

(86) PCT No.: PCT/RU2021/050034
§ 371 (c)(1),
(2) Date: Sep. 22, 2021

(87) PCT Pub. No.: WO2022/031188
PCT Pub. Date: Feb. 10, 2022

(65) Prior Publication Data
US 2022/0307328 A1  Sep. 29, 2022

(30) Foreign Application Priority Data
Aug. 7, 2020 (RU) .......................... RU2020126497

(51) Int. Cl.
*E21B 17/02* (2006.01)
*H02G 1/00* (2006.01)

(52) U.S. Cl.
CPC ............. *E21B 17/026* (2013.01); *H02G 1/00* (2013.01)

(58) Field of Classification Search
CPC ............. F16L 3/06; F16L 3/1075; H02G 1/00
See application file for complete search history.

(56) References Cited

U.S. PATENT DOCUMENTS

| 2002/0030144 | A1* | 3/2002 | Blane ....................... | F16L 3/04 248/74.1 |
| 2018/0355679 | A1* | 12/2018 | Gruber ..................... | F16L 3/04 |
| 2022/0307328 | A1* | 9/2022 | Akchurin .............. | E21B 17/026 |

* cited by examiner

*Primary Examiner* — Minh N Trinh
(74) *Attorney, Agent, or Firm* — Nadya Reingand (57) ABSTRACT

The invention relates to a safety apparatus for cable power lines of submersible electric motors used as drives of centrifugal pumps for the production of oil and other formation fluids. The apparatus contains a housing with a slot for a cable, and clamps arranged along the edges of a first side wall of the housing. Each clamp has one end hinged on the first side wall of the housing, and another end hingedly connected to a corresponding lock. Each lock contains connecting loops with protrusions, and the clamps each clamp is made with recesses and a thrust protrusion corresponding to the protrusions of the loops. Each lock further contains connecting protrusions to create a rigid connection a second side wall of the housing when the lock and the housing are pulled together.

2 Claims, 8 Drawing Sheets

APPARATUS FOR PROTECTING AND ATTACHING CABLE TO PIPES

FIELD OF THE INVENTION

The invention relates to a safety apparatus for cable power lines of submersible electric motors used as drives of centrifugal pumps for producing oil and other formation fluids, control lines of various downhole tools, signal cables, pipelines for liquid, steam or chemical elements, fiber-optic lines, and flexible trailing cables. The invention can be used in the oil and gas industry to protect and attach various cable lines to tubing pipes, as well as production and casing pipes.

BACKGROUND OF THE INVENTION

RU 859594 discloses an apparatus for attaching a power cable to tubing pipes, which is used in tubing strings. The apparatus comprises: a one-piece housing having a longitudinal groove in which the power cable of an electric motor is laid; windows for fixing the apparatus on upper and lower ends of a clamp, the windows being arranged at a height not less than that of the clamp; and ties connecting upper and lower parts of the housing.

The drawbacks of the apparatus known from RU 859594 are as follows: the impossibility of its reuse due to the deposition of paraffin and salts on thrust springs, as well as low operational reliability due to high shock loads during round-trip operations, which lead to the opening of the housing and the blocking of the apparatus between the tubing pipe and a casing string.

RU 2108439 discloses an apparatus for attaching a power cable to tubing pipes. The apparatus comprises: a one-piece housing having a longitudinal groove in which the power cable of an electric motor is laid; windows for fixing the apparatus on lower and upper ends of a clamp, the windows being arranged at a height not less than that of the clamp; and ties connecting upper and lower parts of the housing, the upper and lower parts of the housing being equipped with corresponding upper and lower covers each mounted on a hinge and having a screw for attaching to a corresponding threaded hole made in the upper and lower parts of the housing. The ratio of the window height to the cover width exceeds 2:1.

The drawback of the apparatus known from RU 2108439 is its low reliability caused by that the attachment points of the covers and screws can be destroyed due to the contact of the apparatus elements with the walls and joints of the production pipes during the round-trip operations. The drawback of the apparatus is also a large cross-section, which reduces the free cross-section of a well and impedes a well fluid crossflow during the round-trip operations.

US 2018/0355679 A1 discloses an apparatus for protecting and attaching a cable to pipes. It is used for various pipes, including liners—tail pipes, extension pipes. The apparatus for protecting and attaching the cable to the pipes consists of 3 parts, one of which is configured for threaded connections: —a bar; —a cable slot (cable channel); —a slot and a bar connected with clamps, which allows one to set several degrees of freedom to facilitate the connection. The bar and the slots are connected by means of the threaded connections.

The drawback of the apparatus known from US 2018/0355679 A1 is its low design reliability during the apparatus operation, as well as its large size due to the external arrangement of bolted connection, which also increases the likelihood of sticking the apparatus in the well and impedes the well fluid crossflow.

SUMMARY OF THE INVENTION

The technical result of the invention is to improve the reliability of an apparatus for protecting and attaching a cable to a pipe.

The technical result is achieved by the proposed apparatus for protecting and attaching a cable to a pipe. The apparatus comprises a housing having a slot for the cable. The housing has clamps arranged along edges of side walls of the housing. One end of the clamps is pivotally attached on the first side wall of the housing, while another end of the clamps is pivotally connected to a corresponding lock. The locks comprise connecting loops with protrusions, and the clamps have recesses and a thrust protrusion which correspond to the protrusions. Another end of the locks comprises protrusions to create a rigid connection with the second edge of the side wall of the housing when the lock and the housing are tightened by a bolt screwed into a nut that is mounted in a groove having stop protrusions made in the lock.

The apparatus is also characterized in that the second edge of the side wall has a middle part provided with recesses for fixing the bolts. The groove with the stop protrusions for the nut is made in the middle part of each lock. Each lock has a slope of less than 30 degrees in its upper and bottom parts.

DETAILED DESCRIPTION OF THE INVENTION

Figure 1:
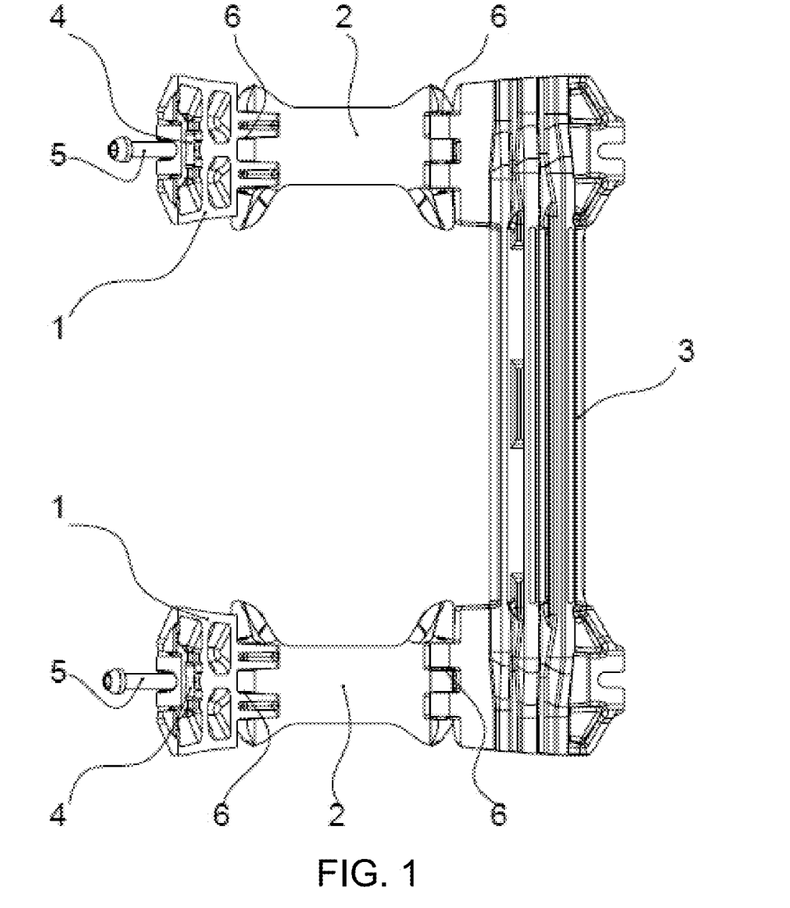
FIG. 1 shows a view of an apparatus.
Figure 2:
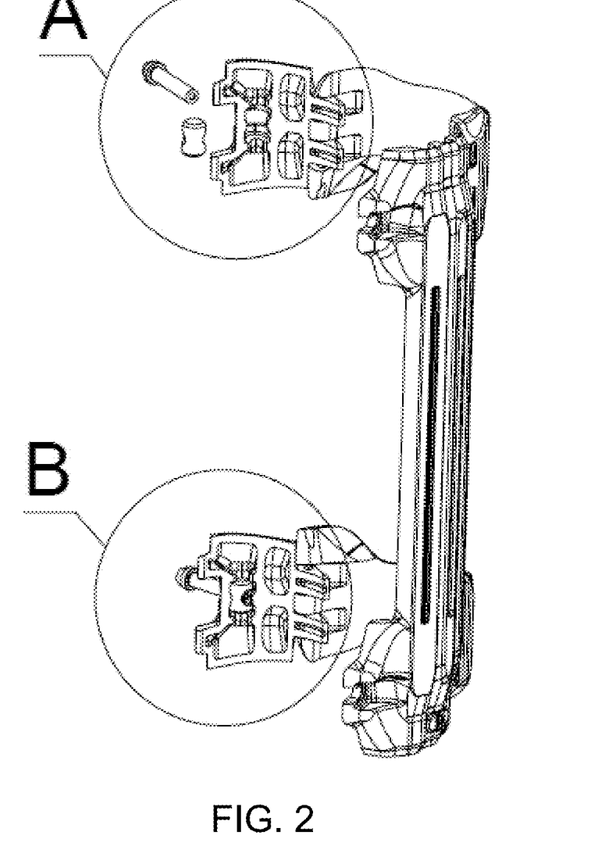
FIG. 2 shows a side view of the apparatus.
Figure 3:
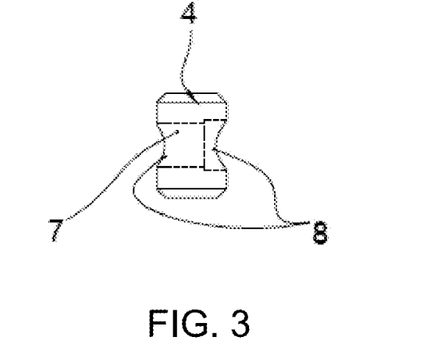
FIG. 3 shows a nut.

An apparatus for protecting and attaching a cable to pipes includes two locks 1, two clamps 2 and a housing 3 having a slot for the cable. The clamps 2 are arranged along the edges of side walls of the housing 3. One end of the clamps 2 is pivotally attached on the first side wall of the housing 3, while another end of the clamps 2 is pivotally connected to the corresponding lock 1. The locks 1 comprise connecting loops 10 with protrusions 11, while the clamps 2 have recesses 16 and a thrust protrusion 15 with a hole which correspond to the protrusions. Another end of the locks 1 comprises protrusions 12 to create a rigid connection with the second edge of the side wall of the housing 3 when the lock 1 and the housing 3 are tightened by a bolt 5 screwed into a nut 4 having a threaded hole 7 and recesses 8 (see FIG. 3). The nut 4 is installed in a groove with stop protrusions 9 made in the lock 1.

Figure 5:
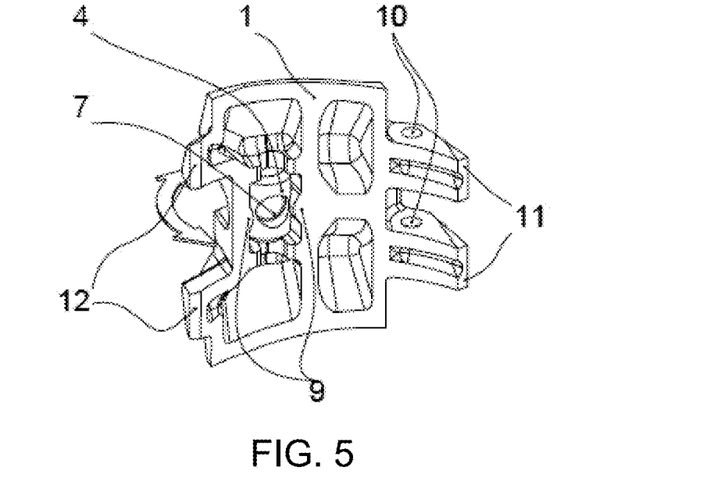
FIG. 5 shows a lock.

The nut 4 is installed in the lock 1 from the inside by combining the recesses 8 with the protrusions 9. After its installation in the lock 1, the nut 4 is rotated (see FIG. 5). After the bolt 5 is screwed into the nut 4, the protrusions 9 do not allow the bolted connection to fall out of the housing 1. In this case, the nut 4 is limited in motion in the lock 1 and may only rotate around its axis.

By holding the nut 4 by means of the protrusions 9 of the lock 1, it is possible to reduce the overall dimensional diameter of the apparatus by making a minimum gap between the attachment point of the bolt 5 with the round nut 4 and a pipe 19 over which the apparatus is slipped. The bolted connection is tightly adjacent to the pipe due to the minimum distance between the nut 4 and the pipe 19 (see FIG. 12), which increases the design reliability.

Figure 9:
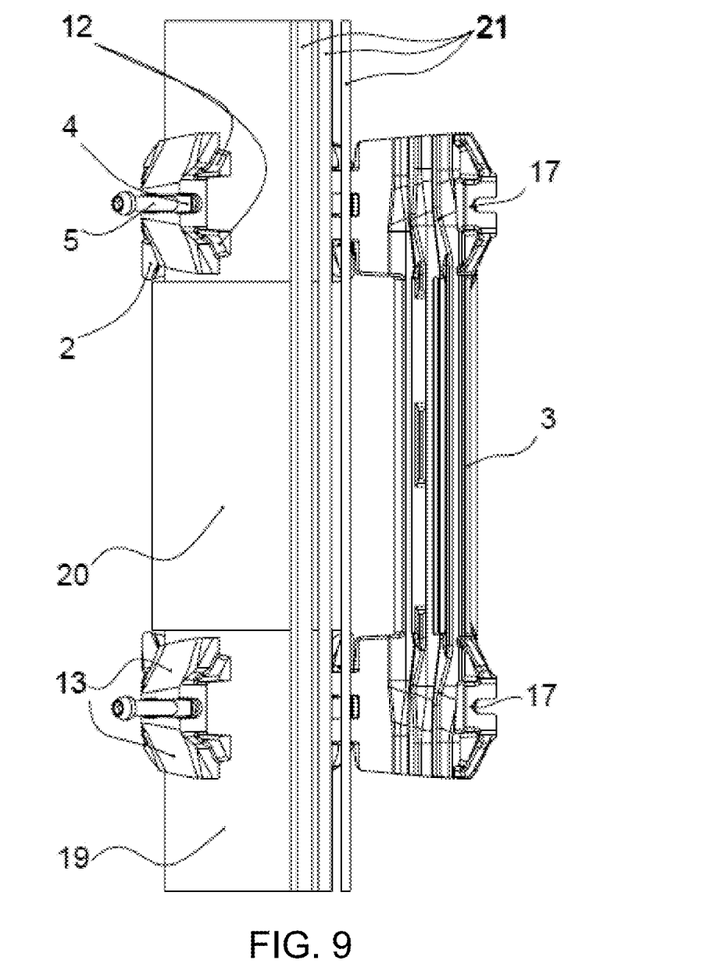
FIG. 9 shows the installation of the apparatus for protecting and attaching the cable to the tubing pipe, in an assembled condition in a side view.
Figure 10:
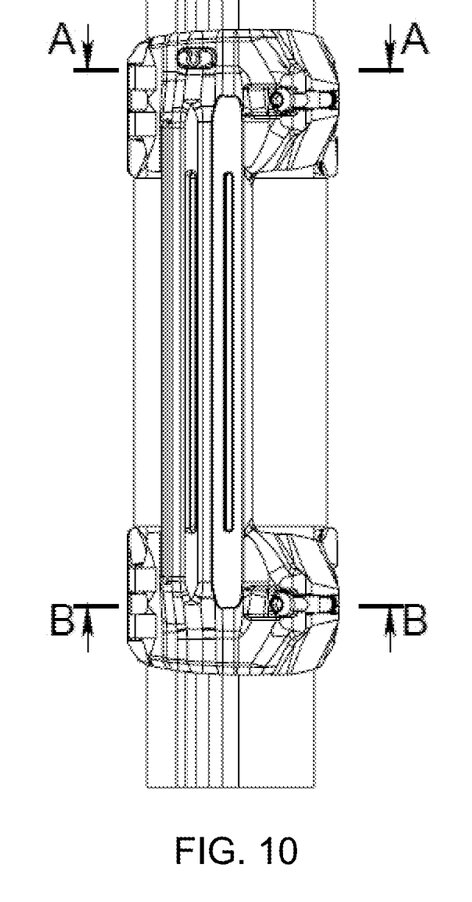
FIG. 10 shows the apparatus for protecting and attaching the cable to the tubing pipe, in the assembled condition in the side view.
Figure 11:
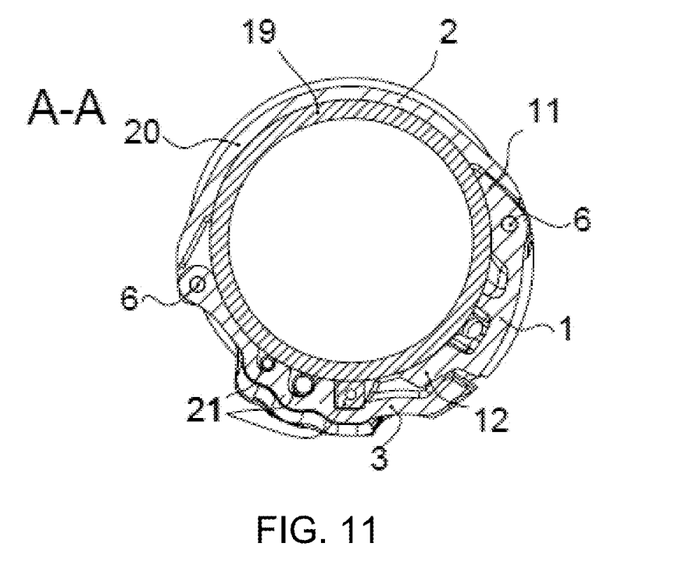
FIG. 11 shows the apparatus for protecting and attaching the cable to the tubing pipe, in the assembled condition in a sectional view taken along line A-A in FIG. 10.

By forming slopes 13 in the upper and lower parts of the lock 1 in the range from 10 to 35 degrees (see FIG. 9), the apparatus sticking is excluded during round-trip operations in a well, which increases the design reliability.

The installation of the nut 4 from the inside of the lock 1 results in a smooth surface outside (see FIGS. 7, 8, 9, 10), which eliminates the apparatus sticking during the round-trip operations in the well, i.e., increases the design reliability.

FIGS. 4, 5, 6, 7, 8, 9, 11 show that the lock 1 comprises the connecting loops 10 with the protrusions 11 to create the rigid connection with the clamp 2 when it is installed on the pipe 19. When installing the apparatus on the pipe 19, the protrusions 11 of the lock 1 fall into the recesses 16 of the clamp 2 and prevent the apparatus from being arbitrarily opened on the pipe, forming an angle of more than 200 degrees therebetween, which prevents the apparatus from being arbitrarily dropped from the pipe 19. The arrangement of the protrusions 11 of the connecting loops 10 of the locks 1 in the recesses 16 of the clamps 2 allows one to improve the apparatus ergonomics and facilitate the apparatus mounting/dismounting. When installing on the pipe 19, the apparatus engages with the pipe 19 by means of the lock 1 and the clamp 2 as the protrusions 11 arranged in the recesses 16 prevent the arbitrary opening of the apparatus, and the apparatus can be released and cannot be held in the hand. After that, one can lay the cable 21 in the protective slot of the housing 3 and fasten the apparatus by pressing the housing 3 with the cable 21 to the pipe 19 and inserting the bolts 5 in the recesses 17 provided in the housing 3, which increases the reliability of the connection between the lock 1 and the clamp 2, while forming additional transverse links therebetween.

FIGS. 5, 7, 8, 9, 11 show that the lock 1 comprises the protrusions 12 to create the rigid connection with the housing 3 when the lock 1 and the housing 3 are tightened by the bolts 5. The arrangement of the protrusions 12 of the locks 1 in the recesses of the housing 3 allows one to increase the reliability of the connection between the lock 1 and housing 3, while forming the additional transverse links. At the same time, the protrusions 12 of the lock 1 cover the bolt 5 from a well fluid flow in an annular space, thereby protecting the bolt 5 from erosion.

Figure 6:
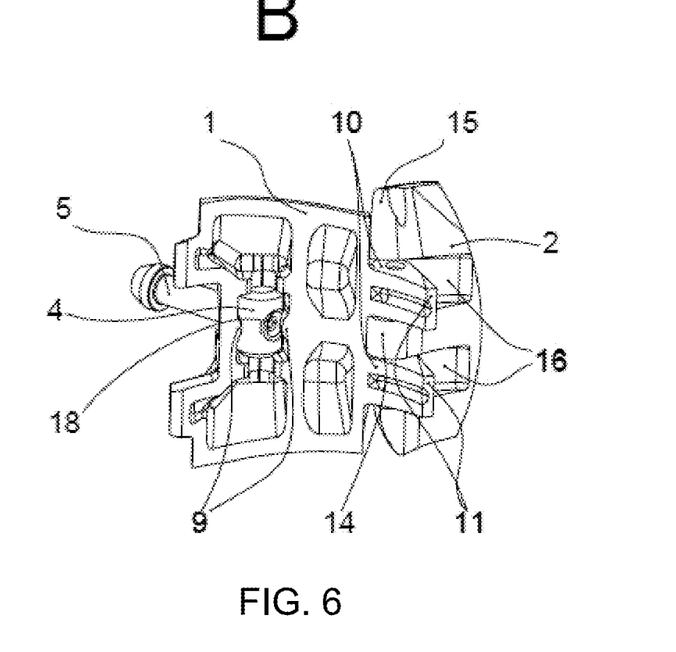
FIG. 6 shows the connection of the lock with the clamp, view B.
Figure 7:
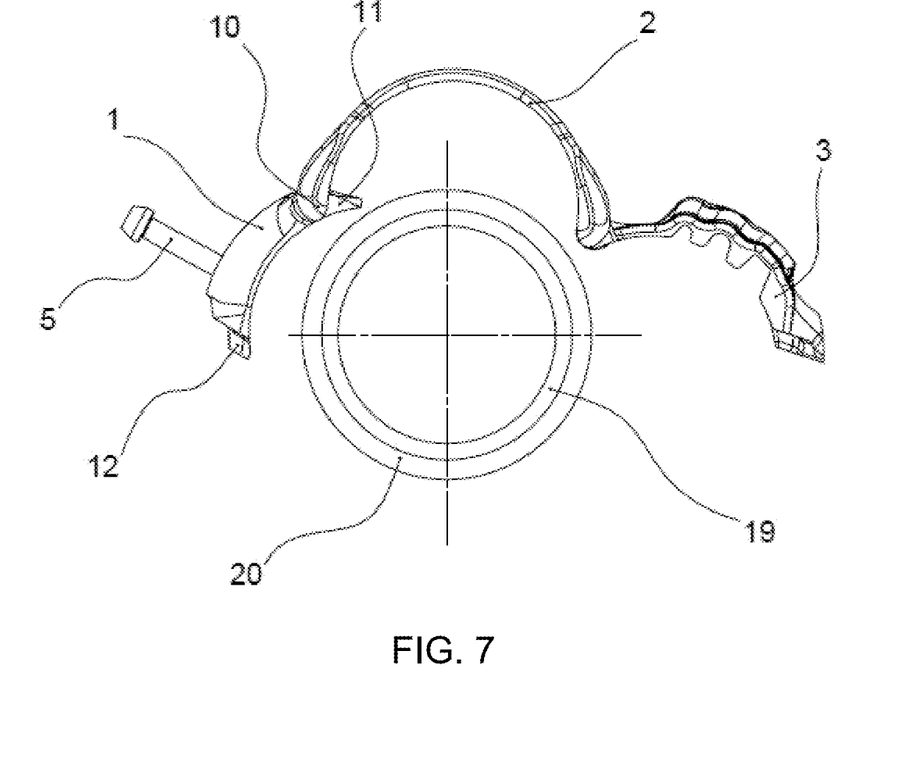
FIG. 7 shows the apparatus for protecting and attaching a cable to a tubing pipe, in an open condition.
Figure 8:
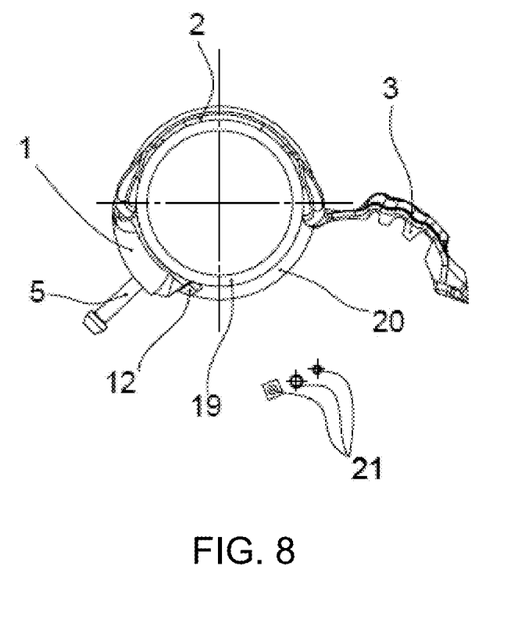
FIG. 8 shows the installation of the apparatus for protecting and attaching the cable to the tubing pipe, in a top view.
Figure 12:
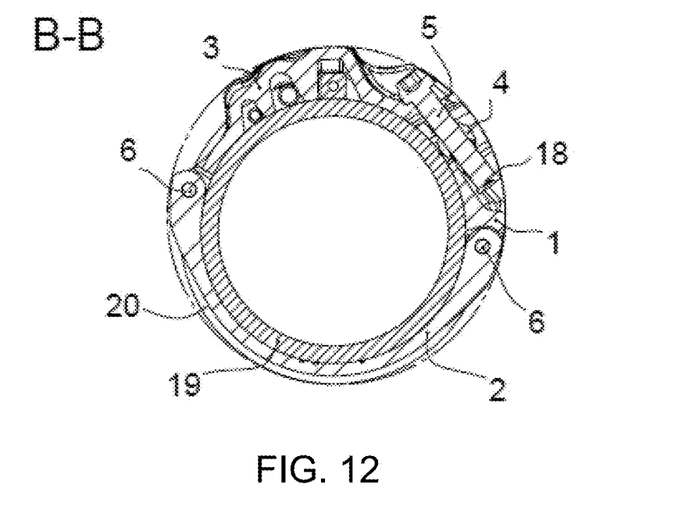
FIG. 12 shows the apparatus for protecting and attaching the cable to the tubing pipe, in the assembled condition in a sectional view taken along line B-B in FIG. 10.

FIGS. 6, 12 show that the bolt 5 has a recess 18 at its end. After the bolt 5 is installed in the nut 4 of the lock 1, the bolt 5 is flared, thereby providing a captive connection, which ensures the reliability of the connection. The arrangement of the recess 18 in the bolt 5 allows one to protect the connection, i.e., prevent the bolt 5 from being dropped from the nut 4.

Figure 4:
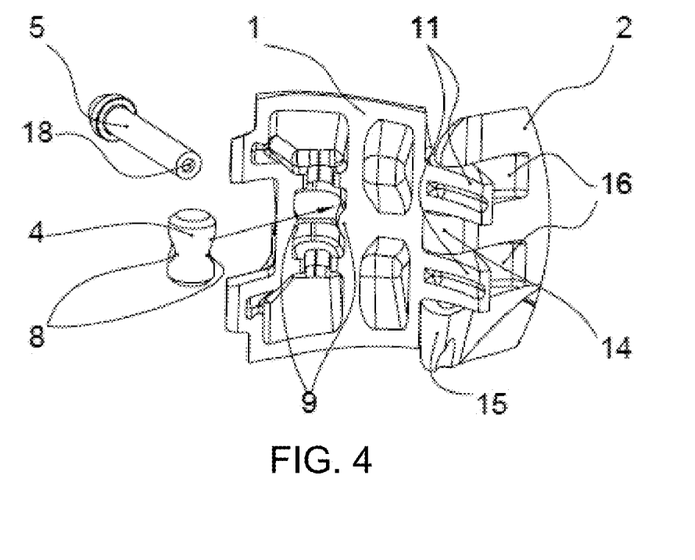
FIG. 4 shows the connection of a lock with a clamp, view A.

FIGS. 4, 6 show that the clamp 2 has loops 14 along its edges and connects the lock 1 and the housing 3 by means of pin studs 6. The clamp 2 comprises the thrust protrusion 15 with the hole. By this protrusion 15, the device rests on a sleeve 20 of the pipe 19 from two opposite sides. After the connecting pin studs 6 are installed, they are bended towards the pipe 19 and hidden in the dimensions of the sleeve 20, thereby protecting the connecting pin stud 6 from falling.

In this design, the lock 1, the clamp 2 and the housing 3 with the slot for the cable are universal elements which can be installed on pipes of different diameters by adjusting the size of the apparatus using the connecting clamps 2.

The invention claimed is:

1. An apparatus for protecting and attaching a cable to pipes, said apparatus comprising:
   a housing having a slot configured to hold the cable, the housing having a first side wall and a second side wall;
   clamps arranged on edges of the first side wall of the housing; and
   locks comprising connecting loops having protrusions;
   wherein each of the clamps has a first end pivotally attached on the first side wall of the housing and a second end pivotally connected to a corresponding lock of the locks;
   wherein each of the clamps comprises recesses and a thrust protrusion which correspond to the protrusions of the connecting loops of the corresponding lock;
   wherein each of the locks further comprises a groove having stop protrusions, the groove being configured to receive a nut;
   wherein each of the locks further comprises connecting protrusions configured to create a rigid connection with the second side wall of the housing when the lock and the housing are tightened by a bolt screwed into the nut mounted in the groove; and
   wherein each of the locks has an upper part, a middle part and a lower part, the groove being made in the middle part, and each of the upper part and the lower part having a downward slope at an angle of 10 to 35 degrees relative to the middle part.

2. The apparatus of claim 1, wherein the second side wall of the housing comprises recesses for receiving the connecting protrusions of each of the locks.

* * * * *